J. Poulson, Jr.
Harvester Rake.
No. 50,159.
Sheet 1 2 Sheets
Patented Sep. 26, 1865
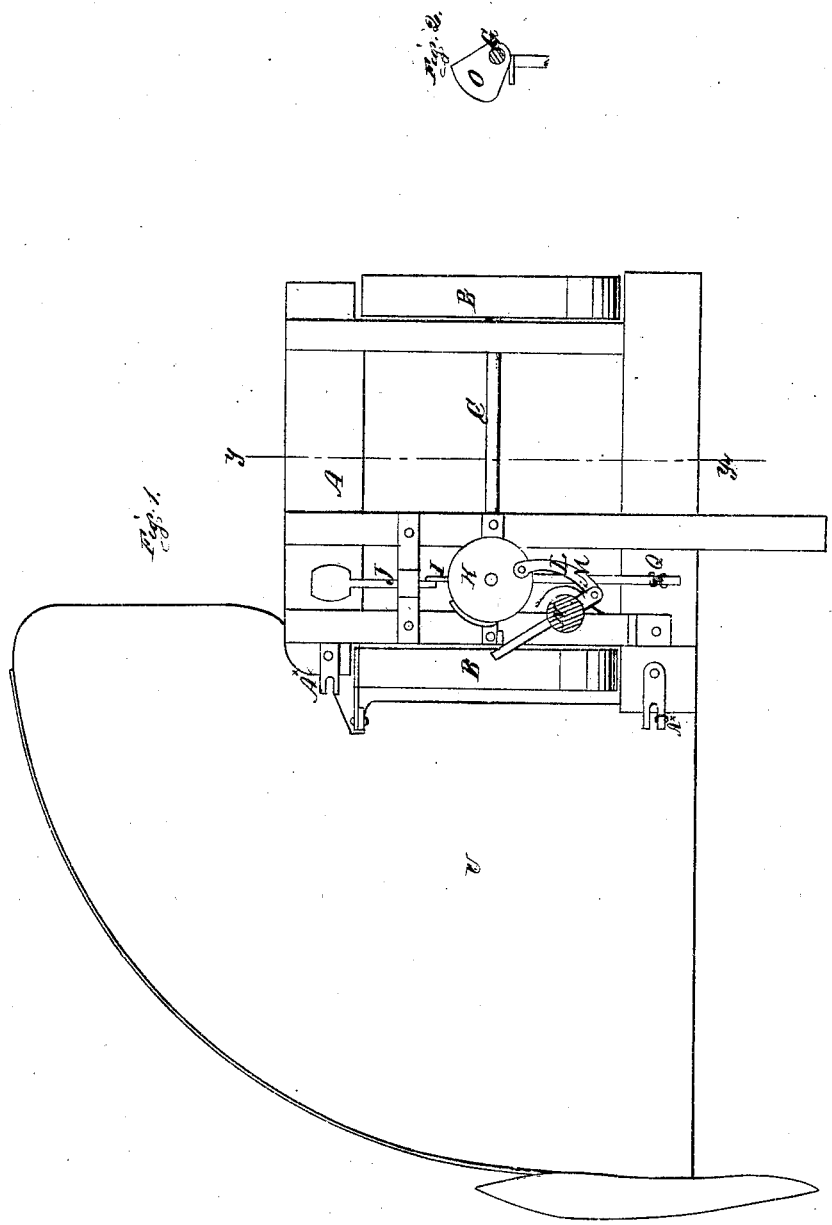
Witnesses:
Inventor:

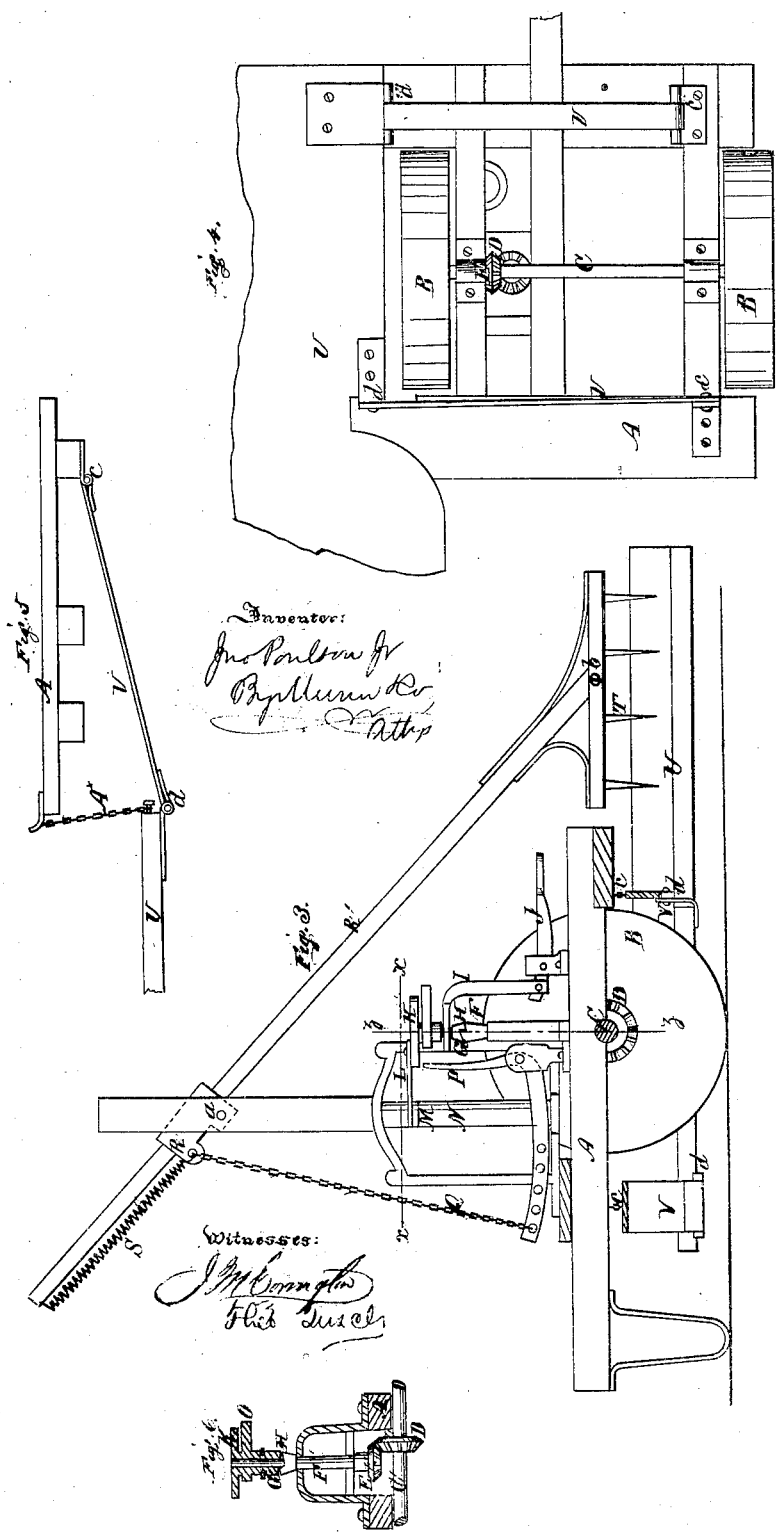

UNITED STATES PATENT OFFICE.

JOHN POULSON, JR., OF PITTSTOWN, NEW JERSEY.

IMPROVEMENT IN HARVESTER-RAKES.

Specification forming part of Letters Patent No. 50,159, dated September 26, 1865.

*To all whom it may concern:*

Be it known that I, JOHN POULSON, Jr., of Pittstown, in the county of Hunterdon and State of New Jersey, have invented a new and Improved Raking-Device for Harvesters; and I do hereby declare that the following is a full, clear, and exact description thereof, which will enable those skilled in the art to make and use the same, reference being had to the accompanying drawings, forming part of this specification, in which—

Figure 1, Sheet No. 1, is a plan sectional view of my invention, taken in the line $xx$, Fig. 3; Fig. 2, a plan or top view of a cam pertaining to the invention; Fig. 3, a vertical section of the invention, taken in the line $yy$, Fig. 1; Fig. 4, an inverted plan or under view of the same; Fig. 5, a front view of a portion of the same; Fig. 6, a vertical section of a portion of the same, taken in the line $zz$, Fig. 3.

Similar letters of reference indicate corresponding parts.

This invention relates to a new and improved automatic raking device for harvesters, as hereinafter fully shown and described, whereby it is believed that a simple, economical, and efficient means is obtained for the purpose specified, and one which will operate perfectly when the machine is passing over undulating or uneven ground.

A represents the main frame of a harvester, which is mounted on two wheels, B B, the latter being permanently or firmly secured on their axle C, so that the latter will turn with the former. On the axle C a bevel-wheel, D, is keyed, and this wheel gears into a corresponding wheel, E, at the lower end of a vertical shaft, F, having on its upper part a sleeve, G, which is connected with F by a clutch, H. This sleeve may be disconnected from the shaft F at any time by raising the sleeve G through the medium of a forked arm, I, and treadle J. (Shown clearly in Fig. 3.)

On the upper end of the sleeve G there is a crank-pulley, K, having a rod, L, attached, said rod being connected to an arm, M, extending horizontally from a vertical shaft, N, on the main frame A. (See more particularly Fig. 1.) On the sleeve G just below the crank-pulley K there is a cam, O, which acts against the upper end of a bent lever, P. (See Fig. 3.) The outer part of the lower arm of this lever P is connected by a chain, Q, with a socket, R', which works on pivots $a$ in the shaft N, as shown clearly in Fig. 3.

R' represents the rake-staff, which is fitted loosely in the socket R, and has a spiral spring, S, attached to it, said spring having a tendency to keep the rake T in contact with the platform U, as will be understood by referring to Fig. 3. The rake T is connected with the staff R' by means of a pivot, $b$, as shown in Fig. 3, and the platform U is connected with the main frame A by means of two bars, V V, one end of which are attached to the under side of the main frame by joints $c$, and the opposite ends attached to the platform by joints $d$. (See Figs. 4 and 5.)

The platform is suspended from the main frame by chains $A^\times$. By this means the platform is permitted to adjust itself to the inequalities of the ground over which it may pass, and, in consequence of having the rake-staff R' work loosely in the socket R and controlled by the spring S, the rake is allowed to yield or give to correspond to the movement of the platform.

As the machine is drawn along the rake is drawn over the platform U from its front to its rear end, in order to rake the cut grain therefrom, by means of the crank-pulley K and connecting-rod L, and when the rake reaches the rear end of the platform it is elevated by means of the cam O, the latter acting against the upper end of the lever P, which, in consequence of its connection with the socket R by the chain Q, raises the rake free from or above the platform, and the cam O bears sufficiently long against lever P to admit of the rake being moved by the crank-pulley and connecting-rod above the platform to the front end thereof, at which point it falls by its own gravity, the cam at this time leaving or passing the lever P and remaining free from it until the rake is again swept over the platform from front to rear in order to rake the cut grain therefrom. The elevated forward movement of the rake prevents the latter from interfering with the grain as it falls thereon.

Thus by this simple arrangement I obtain an economical and efficient raking-device, and one which will work well, whether the machine is passing over even or uneven ground.

Having thus described my invention, I claim as new and desire to secure by Letters Patent—

The shaft N, operated through the medium of the crank-pulley K and connecting-rod L, in connection with the cam O, lever P, chain Q, and pivoted socket R, in which the rake-staff R' is fitted, all being arranged to operate substantially in the manner as and for the purpose specified.

The above specification of my invention signed by me this 3d day of April, 1865.

JOHN POULSON, JR.

Witnesses:
  M. M. LIVINGSTON,
  WM. F. MCNAMARA.